United States Patent [19]

Bordenca

[11] 3,776,714
[45] Dec. 4, 1973

[54] SELECTIVE HERBICIDE COMPOSITION AND PROCESS

[75] Inventor: Carl Bordenca, Vedra Beach, Fla.

[73] Assignee: SCM Corporation, Cleveland, Ohio

[22] Filed: Oct. 7, 1970

[21] Appl. No.: 78,995

Related U.S. Application Data

[63] Continuation-in-part of Ser. No. 740,458, June 27, 1968, abandoned.

[52] U.S. Cl. .................................. 71/98, 71/121
[51] Int. Cl. .................................... A01n 9/12
[58] Field of Search .......................... 71/98, 121

[56] References Cited
UNITED STATES PATENTS
3,397,053  8/1968  Bordenca et al. ..................... 71/98

*Primary Examiner*—James O. Thomas, Jr.
*Attorney*—Merton H. Douthitt

[57] ABSTRACT

Described are a novel class of compounds selected from the group consisting of:

a. a β-di-lower alkylamino lower alkylene ether of the formula:

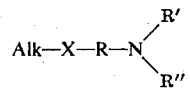

where Alk is a saturated branched chain alkyl group containing from 4 to 16 carbon atoms, X is sulfur or oxygen, R is lower alkylene and R' and R'' are like or dissimilar lower alkyl and b. stable salts thereof.

Processes for selectively controlling undesirable plant growth by application of the compounds falling within the scope of this invention to a plant environment are also described. Crop and grass plants are generally not adversely affected by the compounds when such compounds are used in concentrations which will kill pest weeds.

The compositions and processes of the invention are advantageous in that undesirable pest weeds such as crabgrass, mustard, pigweed, barn grass, and morning glory are substantially eliminated in fields where valuable crops such as bluegrass, corn, cotton, soybeans, and wheat are planted and are grown.

5 Claims, No Drawings

SELECTIVE HERBICIDE COMPOSITION AND PROCESS

This application is a Continuation-in-Part of United States application Ser. No. 740,458 filed June 27, 1968 and now abandoned, both applications having a common assignee. Application Ser. No. 740,458 is hereby incorporated by reference.

The present invention relates to a novel class of selective herbicidal compositions. The invention further relates to processes for selectively controlling the growth of certain pest weeds without substantially adversely affecting the growth of valuable plants. The invention is advantageous in that it makes possible the growth of corn, oats, soybeans, wheat, and the like in fields and blue grass in lawns which are made free, or substantially free, of common pest weeds.

The term "herbicidal composition(s)," as used herein, is intended to mean and to refer to a novel class of compounds or formulations containing them which have specific herbicidal activity against certain hereinafter-defined pest weeds without substantially affecting the growth of valuable plants such as, for example, ornamental plants, bluegrass, and crop plants.

The terms "pre-emergent herbicide" or "pre-emergent herbicidal composition," as used herein, are intended to mean and to refer to compounds or formulations which, when applied to or incorporated in soils containing pest-weed seeds and in which valuable plant seeds will be planted or have been planted but have not emerged, will selectively prevent, impair, or inhibit the germination and/or growth of a wide variety of undesirable pest weeds without substantially adversely affecting the growth of the valuable plants.

The terms "post-emergent herbicide" or "post emergent herbicidal composition," as used herein, are intended to mean and to refer to compounds or compositions which, when applied to fields containing pest weeds or valuable plants and pest weeds, will selectively kill or substantially damage a wide variety of the pest weeds without significantly adversely affecting the growth of the valuable plants.

In its broadest aspect, the invention provides a compound selected from the group consisting of a. a β-di-lower alkylamino lower alkylene ether of the formula:

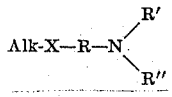

where Alk is a saturated branched chain alkyl group containing from 4 to 16 carbon atoms, X is sulfur or oxygen, R is lower alkylene, and R' and R" are like or dissimilar lower alkyl and b. stable salts thereof.

Compositions falling within the scope above described have, depending upon the level applied to or incorporated in the soil or the particular weed infestation which it is desired to eliminate, selective pre-emergent or post-emergent activity. Also, as will be hereinafter evident, certain of the compounds are more advantageously employed as selective pre-emergent herbicides, while others will be more advantageously employed as selective post-emergent herbicides.

The herbicidal activity of the compounds falling within the scope of this invention is unexpected in that similar compounds; that is, analogs, homologs, and isomeric compounds containing straight chain instead of branched chain saturated alkyl groups have general, rather than selective, phytotoxic properties; and other similar compounds have no herbicidal activity. Also, in compounds containing straight chain saturated alkyl groups (represented in the above formula by "Alk"), where such compounds have herbicidal activity, they affect or kill the pest weeds by a different physiological mechanism. Thus, for example, isomers of compounds wherein Alk is an unbranched isomer, the physiological mechanism of injury is one wherein the development of chloroplasts in the pest weeds is inhibited or the chlorophyll within the chloroplasts is degraded. On the other hand, the mechanism of injury to pest weeds treated with isomeric compounds wherein Alk is a branched chain isomer and falling within the scope of this invention is one in which the photosynthetic reactions in the pest weeds have been partially to completely inhibited.

In compounds represented by the above formula, Alk is a branched alkyl group containing from 4 to 16 carbon atoms. If the alkyl group contains less than 4 or more than 16 carbon atoms the compounds sometimes lose their herbicidal effectiveness or their herbicidal selectivity against pest weeds.

Particularly advantageous compounds are those where Alk is a branched-chain alkyl group containing between 10 and 14 carbon atoms. Examples of advantageous compounds are those in which Alk is branched butyl, pentyl, hexyl, heptyl, octyl, nonyl, decyl, undecyl, and dodecyl groups. Of these alkyl groups, compounds in which Alk is 3,7-dimethyl octyl; e.g., a branched decyl, and wherein Alk is 4,6,8-trimethyl nonyl; e.g., a branched dodecyl, have been found to be particularly advantageous.

In the compounds represented by the above formula and falling within the scope of this invention X is sulfur or oxygen. As will be evident hereinafter from the specific examples, there are some differences in selective activity between the ethers and thioethers.

Also, in compounds represented by the above formula, R is lower alkylene and is preferably ethylene, propylene or butylene for economic reasons; R' and R" are like or dissimilar lower alkyl, and are preferably like lower alkyl because of the difficulty in preparing compounds in which R' and R" are unlike. R' and R" are preferably like lower alkyl and there more preferably ethyl, propyl, or butyl for economic reasons.

Compounds falling within the scope of this invention generally have limited water solubility but are soluble in conventional solvents commonly used in the agricultural pesticide art. Such compounds can be dispersed in water by using them in conjunction with a conventional oil-and-water emulsifier.

Alternatively, the compounds can be made water soluble without substantially altering their herbicidal activity by converting the compounds into certain of their stable salts. This can be accomplished by treating the compounds with an appropriate acid such as, for example, hydrochloric, hydrobromic, sulfuric, phosphoric and the like to form the corresponding hydrochloride, hydrobromide acid sulfate and acid phosphate, etc., salts. Such stable salts are effectively soluble in water. The compounds as well as their salts can be applied to soils and/or plants in the form of aqueous dispersions or emulsions, either alone or in conjunction with another hereinafter-defined carrier. They can also be applied to the soils in combination with a conventional plant food or fertilizer.

Preferred salts of the compounds falling within the scope of this invention are hydrohalide salts such as, for example, hydrochlorides or hydrobromides, since these salts have been found to be particularly effective against common pest weeds.

Examples of specific compounds falling within the scope of the selective herbicides of this invention are:

β-diethyl aminoethyl 3,7-dimethyl octyl ether
β-diethyl aminoethyl 3,7-dimethyl octyl thioether
β-dimethyl aminoethyl 3,7-dimethyl octyl ether
β-dimethyl aminoethyl 3,7-dimethyl octyl thioether
β-diethyl aminopropyl 3,7-dimethyl octyl ether
β-diethyl aminopropyl 3,7-dimethyl octyl thioether
β-dipropyl aminoethyl 3,7-dimethyl octyl ether
β-dipropyl aminoethyl 3,7-dimethyl octyl thioether
β-dibutyl aminopropyl 3,7-dimethyl octyl ether
β-dibutyl aminopropyl 3,7-dimethyl octyl thioether
β-diethyl aminoethyl 4,6,8-trimethyl nonyl ether
β-diethyl aminoethyl 4,6,8-trimethyl nonyl thioether
β-dimethyl aminoethyl 4,6,8-trimethyl nonyl ether
β-dimethyl aminoethyl 4,6,8-trimethyl nonyl thioether
β-diethyl aminopropyl 4,6,8-trimethyl nonyl ether
β-diethyl aminopropyl 4,6,8-trimethyl nonyl thioether
β-dipropyl aminoethyl 4,6,8-trimethyl nonyl ether
β-dipropyl aminoethyl 4,6,8-trimethyl nonyl thioether
β-dibutyl aminopropyl 4,6,8-trimethyl nonyl ether
β-dibutyl aminopropyl 4,6,8-trimethyl nonyl thioether In addition to the foregoing, other advantageous specific compounds include the foregoing hydrohalide, acid sulfate, and acid phosphate salts of the above-described compounds.

The compounds of this invention and their stable salts can be used alone or can be incorporated in, and used in conjunction with, a carrier. Such a carrier can be an inert diluent or a different type of soil-treating agent; such as, for example, a commercial plant food or fertilizer. Where the composition consists of one or more of the compounds of this invention or salts thereof and an inert diluent, such diluent can include a wide variety of organic and inorganic solid, liquid, or semisolid carriers or carrier formulations conventionally used in herbicidal formulations.

Examples of liquid organic carriers include liquid aliphatic hydrocarbons such as pentane, hexane, heptane, nonane, decane, and their analogs as well as liquid aromatic hydrocarbons; such as, for example, xylene. Other liquid hydrocarbons include oils produced by the distillation of coal and/or the distillation of various types and grades of petroleum stocks.

Petroleum oils are especially desirable and include kerosene oils; that is, oils composed of hydrocarbon mixtures of molecular weight; e.g., hydrocarbons containing between 10 and 16 carbon atoms which are obtained by fractional distillation of cracked petroleum at a temperature of between 360°–510° F. and which usually have a cracking point between 150°–185° F.

Other petroleum oils include those generally referred to in the art as agricultural spray oils and are light and medium oils which consist of the middle fractions of the distillation of petroleum and usually have a viscosity in the range of from 40–85 sec. Saybolt at 100° F. and are only slightly volatile. These oils are usually refined and contain only minute amounts of unsaturated hydrocarbons as measured by standard sulfonation tests. The customary sulfonation range of such oils is usually between 90 per cent and 94 per cent unsulfonatable residue. Such oils, often referred to as paraffin-type oils, are advantageous in that they can be emulsified with water and used in controlled concentrations in sprays. Tall oils obtained from the sulfate digestion of wood pulp may also be employed.

In addition to the above-mentioned liquid hydrocarbons, and usually used in conjunction therewith, the carrier can contain the conventional emulsifying agent; such as, for example, a non-ionic detergent such as an ethylene oxide condensate of an alkyl phenol or an anionic surfactant such as an alkali metal salt of an alkylbenzene sulfonic acid.

Such emulsifiers are added and used to enable the compositions to be diluted with water for end-use applications usually when paraffin oils are employed and emulsifiers included in the mixture and diluted with water just prior to end-use application.

By way of example, when certain water-insoluble compounds falling within the scope of this invention are dissolved in paraffin containing an emulsifier such compositions are diluted with water to form an oil-in-water emulsion. The resulting emulsion, when atomized and sprayed on soils containing planted crop seeds and undesirable volunteer weed seeds prior to the emergence of the seeds will prevent the normal germination and appearance of the undesirable weeds without danger of injury to the valuable plants. On the other hand, when certain compositions are similarly dissolved, emulsified, and sprayed on fields containing valuable crops or grass and pest weeds, the pest weeds will be damaged or killed while the valuable plants remain virtually unaffected.

Other advantageous organic carriers include liquid terpene, hydrocarbons, and alcohols such as, for example, α-pinene, dipentene, terpineol, etc. Still other organic liquid carriers include organic solvents such as aliphatic and aromatic alcohols, aldehydes, and ketones. Suitable aliphatic alcohols include glycols such as ethylene and propylene glycol and the pinacols; for example, the alcohols having the formula $C_6H_{12}(OH)_2$.

Suitable polyhydroxy alcohols include glycerol, sorbitol, erithretol, arabitol, and the like. Suitable cyclic alcohols include cyclo pnetenyl and the cyclohexyl alcohols.

Aromatic and aliphatic esters, aldehydes, and the ketones are often used in conjunction with the above alcohols as carriers. Still other liquid carriers include higher boiling petroleum products such as mineral oil, and higher molecular weight alcohols such as cetyl alcohol (sometimes referred to as liquid waxes) can also be used.

Solid carriers which may be employed in the composition of this invention include finely divided organic and inorganic solid materials such as clays; for example, attapulgite, bentonite, Fuller's Earth, diatomaceous earth, kaolin, mica, talc, vermiculite and finely divided quartz, as well as synthetically prepared siliceous materials such as precipitated and fume silicas and silica arogels.

Other examples of finely divided solid inorganic carriers include commercial fertilizers and plant foods containing potassium phosphorus and nitrogen, which are both water soluble and water insoluble, suitable examples of which are described in "Encyclopedia of Chemical Technology" by Kirk-Othmer, Volume 9, pages 25-47, published by Interscience Publishers of New York, Inc., January, 1966.

Examples of finely divided solid organic materials include starch, flour, sugar, powdered sawdust, casein, gelatin, and the like. Examples of semisolid organic carriers include petroleum jelly, lanolin, and the like and mixtures of these with any of the above-defined solid and liquid carriers and/or emulsifiers, when desired.

Compositions containing, in combination, the compounds of this invention and the above-described diluents can be employed *per se* or can be diluted with suitable liquids or can be applied to the soil in liquid or dust form or can be mixed with the soil by conventional agricultural cultivation techniques.

The present invention provides a method for selectively controlling undesirable plant growth, which comprises applying to an environment in which desirable or valuable plants have been planted an amount of any of the hereinbefore-defined compositions effective for substantially inhibiting the growth of pest weeds without substantially inhibiting the growth of the seeded desirable plants and wherein said amount is not substantially in excess of about 10 pounds per acre.

The amount of herbicidal composition or compound falling within the scope of this invention which may be applied to an environment, preferably a soil environment (although sand may sometimes constitute the environment), will vary considerably, depending upon the particular valuable plant involved, the kind of pest weeds indigenous to the particular environment, and whether the material is to be used pre-emergently, post-emergently, or incorporated in the soil prior to planting the seeds.

Generally, the amount will not be substantially in excess of 10 pounds of herbicidal compound per acre of soil. If more than 10 pounds of herbicidal compound per acre are applied per acre of soil, some crops may undergo a certain amount of injury. If less than about 2.5 pounds of herbicidal compound are applied per acre of soil, certain seeds may not be killed or substantially damaged, thus lessening the effectiveness of the treatment. Where the compounds are to be used pre-emergently, from about 8 to 10 pounds of compound per acre of soil are desirably employed.

On the other hand, when the compounds are employed post-emergently or are soil incorporated, from about 2.5 to about 5 pounds of compound per acre of soil are usually effective in killing or inhibiting the growth of common pest weeds without damage to crop plants. Although in the case of certain plants, such as corn, cotton, and bluegrass, up to and more than 10 pounds per acre of at least one of the compounds of this invention can be applied without adversely affecting the plants, other plants, such as soybeans and rice, may exhibit some stunted or inhibited growth.

The following specific examples are intended to illustrate the invention but not to limit the scope thereof, parts and percentages being by weight unless otherwise specified.

EXAMPLE 1

Four separate acetone solutions were prepared, each containing 2.5 weight per cent of one of the following compounds:

$\beta$-diethyl aminoethyl 3,7-dimethyl octyl ether
$\beta$-diethyl aminoethyl 3,7-dimethyl octyl thioether
$\beta$-diethyl aminoethyl 4,6,8-trimethyl nonyl ether
$\beta$-diethyl aminoethyl 4,6,8-trimethyl nonyl thioether The four solutions were tested for selective post-emergent herbicidal activity using the following standard agricultural screening procedure for post-emergent herbicides.

Three groups of individual disposable 4-inch square by 6-inch deep containers were filled with standard soil and the containers of each group seeded according to growth requirement schedules and containing respectively corn, oats, rice, soybeans, cotton, mustard, yellow foxtail, barnyard grass, crabgrass, millet, pigweed, buckwheat, coffeeweed, and morning glory. When the plants had reached a growth stage characterized by the first true leaf formation, they were placed in carrying trays and treated. Each of the first group of containers was sprayed with an amount of acetone solution to provide a compound application equivalent to 10 pounds per acre of soil.

Each of the second group of containers was sprayed with an amount of acetone solution sufficient to provide a compound application equivalent to 5 pounds of compound per acre of soil. Each of the third group of containers was sprayed with an amount of acetone solution sufficient to provide an amount of compound application equivalent to 2.5 pounds of compound per acre of soil. After treatment the plants were observed daily, the final observation being made 14 days from the date of the treatment.

Observations included all abnormal phytological responses including stem bending, petiole curvature, epinasty, hyponasty, retardation, stimulation, root development, necrosis, and associated growth regulant characteristics.

In the group of containers which received the solutions in an amount equivalent to 10 pounds of compound per acre, mustard, yellow foxtail, barnyard grass, crabgrass, millet, pigweed, buck-wheat, coffeeweed, and morning glory plants were either killed or damaged to such an extent that the plants usually did not recover. On the other hand, corn, rice, and oats showed a slight growth retardation from which the plants recovered.

In the group of containers to which the solutions were applied to plants in amounts equivalent to 5 pounds of compound and 2.5 pounds of compound per acre, mustard and morning glory plants were killed; yellow foxtail, barnyard grass, crabgrass, millet, pigweed, coffeeweed, and buckwheat were severely damaged, and the plants usually did not recover. The corn and oats showed a slight retardation in growth from which the plants recovered. Cotton and soybean were substantially unaffected.

A control series of plants grown simultaneously served as untreated controls and exhibited no damage.

When the corresponding analogous, e.g., $\beta$-diethyl aminoethyl n-decyl ether and its corresponding thioether and the $\beta$-diethyl amino ethyl n-dodecyl ether and its corresponding thioether were tested in the same manner, a significant number of the weed plants showed phytological abnormality from which a great majority of the plants recovered. Comparative observations of the plants treated with branched chain compounds exhibited a different type of response than those treated with straight chain compounds. The plants treated with the unbranched isomers were a pale greenish-yellow whereas the plants treated with the branched isomers retained their normal green color. These observations indicate that the unbranched isomers in some way prevent the development of chloroplast within the plants or initiate degradation of the chlorophyll within the chloroplast of the growing plants, whereas the injury mechanism involved in the use of straight chain compounds involves inhibition of the photosynthetic process.

EXAMPLE 2

Four separate test formulations, each containing 2.5 weight per cent of one of the four compounds employed in Example 1 were prepared. The four solutions were tested for selective preemergent herbicidal activity by incorporating the solutions in soils in amounts equivalent to 10.5 and 2.5 pounds of compound per acre of soil.

In a second test the seeds were planted following the procedure described in Example 1 and, after planting but prior to emergence of the seedlings from the soil, identical amounts of material were applied to the surface of the soils containing the seeds. A separate series of plants were similarly treated with a non-standard — 3′,4′-dichloropropionanalide. Each material was observed for its activity on the planted seeds of ryegrass, soybean, coffeeweed, rice, carrot, corn, millet, cotton, crabgrass, and barnyard grass. Barnyard grass, crabgrass, and millet exhibited between a 95–100 per cent kill when exposed to all of the solutions at the various levels. Corn, rice, carrot, cotton, and soybean plants exhibited no injury. The standard 3′,4′-dichloropropionanalide killed barnyard grass and millet and was moderately injurious to cotton and coffeeweed.

EXAMPLE 3

The procedure of Example 2 was repreated except that the following compounds were used in place of the compounds employed in Example 2:

β-dipropyl aminoethyl 3,7-dimethyl octyl ether
β-dipropyl aminoethyl 3,7-dimethyl octyl thioether
β-dipropyl aminoethyl 4,6,8-dimethyl nonyl ether
β-dipropyl aminoethyl 4,6,8-dimethyl nonyl thioether
β-diethyl aminoethyl tertiary dodecyl ether*
β-diethyl aminoethyl tertiary dodecyl thioether*
*(A mixed isomer branched product containing tributyl and tetrapropyl products.) In all instances the results were substantially those obtained in Example 2.

In many cases a much lower level of compound is required when the compound is soil incorporated. By way of example, β-diethyl aminoethyl 3,7-dimethyl octyl ether killed 100 per cent of ryegrass and barnyard grass when incorporated in soil at a level equivalent to 8 pounds of compound per acre of soil whereas no ryegrass is killed at this level although 100 per cent pigweed and barnyard grass are not damaged. Cotton plants were unaffected by the compound when soil incorporated or when applied pre-emergently.

EXAMPLE 4

The procedure of Example 1 was repeated except that the hydrochloride salts of

β-diethyl aminoethyl 3,7-dimethyl octyl ether
β-diethyl aminoethyl 3,7-dimethyl octyl thioether
β-diethyl aminoethyl 4,6,8-trimethyl nonyl ether
β-diethyl aminoethyl 4,6,8-trimethyl nonyl thioether In each instance, the phytocidal results were substantially identical to the results obtained in Example 1.

EXAMPLE 5

The procedure of Example 2 was repeated except that the hydrochloride salts of

β-diethyl aminoethyl 3,7-dimethyl octyl ether
β-diethyl aminoethyl 3,7-dimethyl octyl thioether
β-diethyl aminoethyl 4,6,8-trimethyl nonyl ether
β-diethyl aminoethyl 4,6,8-trimethyl nonyl thioether were employed in place of the compounds employed in Example 2. The pre-emergent tests were substantially identical to those obtained in Example 2. The soil incorporated tests indicated that the salts of the compounds are generally more phytotoxic and damage crops such as lima beans and ryegrass.

What is claimed is:

1. The method of selectively controlling undesirable plant growth which comprises applying to an environment in which desirable plants have been planted an amount, effective for substantially inhibiting the growth of said undesirable plants, said amount not being substantially in excess of about 10 pounds per acre, of a β-di-lower alkylamino lower alkylene ether or thioether of the formula:

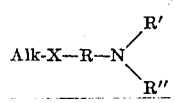

where X is sulfur or oxygen;
R is lower alkylene;
R′ and R″ are like or dissimilar lower alkyl; and
Alk is a $C_{10-12}$ branched alkyl;
or a stable salt thereof.

2. The method of claim 1 wherein said multi-branched $C_{10-12}$ alkyl group is 3,7-dimethyloctyl and the compound is an ether.

3. The method of claim 1 wherein said multi-branched $C_{10-12}$ alkyl group is 3,7-dimethyloctyl and the compound is a thioether.

4. The method of claim 1 wherein said multi-branched $C_{10-12}$ alkyl group is a 4,6,8-trimethylnonyl group and the compound is an ether.

5. The method of claim 1 wherein said multi-branched $C_{10-12}$ alkyl group is a 4,6,8-trimethylnonyl group and the compound is a thioether.

* * * * *